United States Patent
Tromp et al.

(10) Patent No.: US 10,502,603 B2
(45) Date of Patent: Dec. 10, 2019

(54) METHOD FOR OPERATING A NUCLEAR MAGNETIC FLOWMETER

(71) Applicant: Krohne AG, Basel (CH)

(72) Inventors: Rutger Reinout Tromp, Dordrecht (NL); Marco Leendert Zoeteweij, Hendrik-Ido-Ambach (NL)

(73) Assignee: KROHNE AG, Basel (CH)

( * ) Notice: Subject to any disclaimer, the term of this patent is extended or adjusted under 35 U.S.C. 154(b) by 850 days.

(21) Appl. No.: 14/950,422

(22) Filed: Nov. 24, 2015

(65) Prior Publication Data

US 2016/0153817 A1 Jun. 2, 2016

(30) Foreign Application Priority Data

Nov. 27, 2014 (DE) .................. 10 2014 017 494
Apr. 27, 2015 (DE) .................. 10 2015 005 300

(51) Int. Cl.
*G01F 1/716* (2006.01)
*G01F 1/74* (2006.01)

(52) U.S. Cl.
CPC ............. *G01F 1/716* (2013.01); *G01F 1/74* (2013.01)

(58) Field of Classification Search
CPC ......... G01F 1/716; G01F 1/74; G01R 33/563; G01R 33/56308; G01R 33/56316; G01N 24/08; G01N 24/081; G01N 24/082
USPC .................................................. 324/303, 306
See application file for complete search history.

(56) References Cited

U.S. PATENT DOCUMENTS

| | | | | |
|---|---|---|---|---|
| 6,046,587 A | * | 4/2000 | King | E21B 47/102 324/306 |
| 6,891,369 B2 | * | 5/2005 | Hurlimann | G01N 24/081 324/303 |
| 8,729,893 B2 | * | 5/2014 | Li | G01N 24/081 324/303 |
| 10,151,817 B2 | * | 12/2018 | Hogendoorn | G01F 1/716 |
| 2005/0140368 A1 | * | 6/2005 | Freedman | E21B 49/08 324/303 |
| 2006/0071661 A1 | * | 4/2006 | Ong | G01F 1/716 324/303 |
| 2008/0174313 A1 | * | 7/2008 | Ganesan | G01N 24/081 324/313 |
| 2011/0001474 A1 | * | 1/2011 | Miller | G01F 1/56 324/306 |
| 2016/0313159 A1 | * | 10/2016 | Appel | G01F 1/716 |

\* cited by examiner

*Primary Examiner* — Steven L Yeninas
(74) *Attorney, Agent, or Firm* — David S. Safran; Roberts Mlotkowski Safran Cole & Calderon, P.C.

(57) ABSTRACT

A method for operating a nuclear magnetic flowmeter for determining the flow of a multi-phase medium flowing through a measuring tube that is suitable for media exhibiting "phase slip" with which the characterization of the gaseous phase is simplified, is achieved by a pulse spoiling the magnetization at least in the direction of the magnetic field or a pulse sequence spoiling the magnetization in the direction of the magnetic field being emitted by a coil-shaped antenna, particularly in combination with dephasing gradients, and then, after a waiting time $t_w$, a nuclear magnetic measurement is carried out in that the medium is excited with excitation pulses by the coil-shaped antenna and the measuring signals generated by the excitation in the medium are detected.

6 Claims, 1 Drawing Sheet

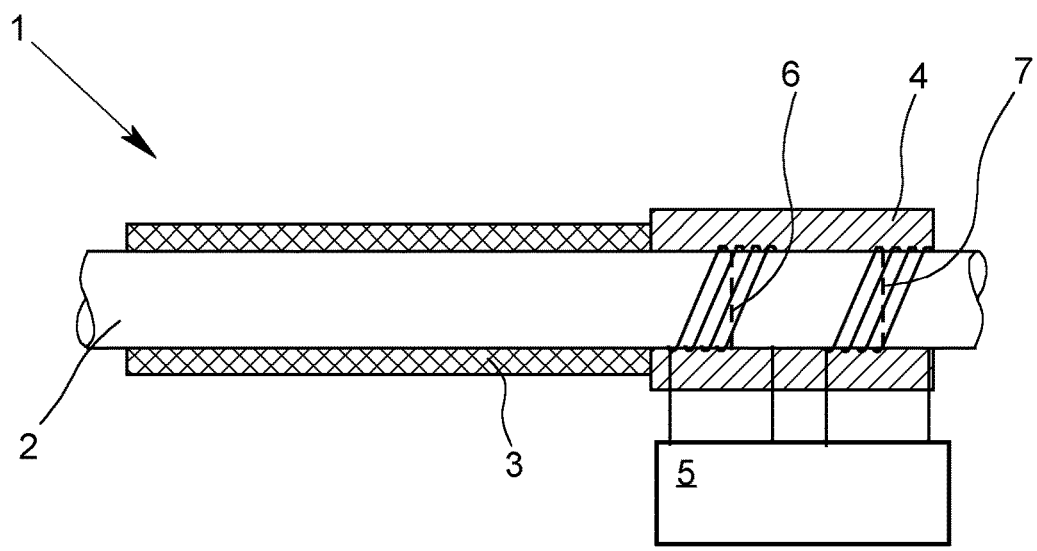
Prior Art

METHOD FOR OPERATING A NUCLEAR MAGNETIC FLOWMETER

BACKGROUND OF THE INVENTION

Field of the Invention

The invention relates to a method for operating a nuclear magnetic flowmeter for determining the flow of a multi-phase medium flowing through a measuring tube, having a pre-magnetization unit for pre-magnetization of the medium, having a magnetic field generator for generating a magnetic field interfusing the medium and having a measuring device, wherein the measuring device includes at least one coil-shaped antenna for generating excitation signals exciting the medium and/or for detecting measuring signals emitted by the medium.

Description of Related Art

Nuclear magnetic flowmeters are designed for determining the flow of a medium flowing through a measuring tube. Here, the medium can contain one phase or several phases. In the case of a single-phase medium, the determination of the flow is carried out by determining the flow velocity of the medium. In addition to the determination of the flow velocity, a determination of the relative portions of the individual phases in the medium is part of the determination of the flow of a multi-phase medium.

A basic requirement of the applicability of nuclear magnetic measuring methods is that the medium or each phase of the medium has atomic nuclei with magnetic moments. If a system of atomic nuclei bearing magnetic moments is located in an external magnetic field having a certain direction, then the magnetic moments of the atomic nuclei are oriented in the external magnetic field. The magnetic moments here adopt a state parallel or antiparallel to the outer magnetic field, wherein the state parallel to the outer magnetic field is occupied with a higher probability, so that a "net magnetization" parallel to the outer field is formed in the system. This "net magnetization" is also called equilibrium magnetization. The magnetization can be deflected out of equilibrium by an external disturbance. As soon as the disturbance is gone, the magnetization strives to return to the equilibrium state, i.e., to relax into its equilibrium state. Both the magnetic moment and the outer magnetic field can be described as vectors. In the relaxation process, the vectors of the magnetic moment precess around the vector of the macroscopic magnetic field. The frequency of precession is the Larmor frequency $\omega_L$ and is proportional to the magnitude of the magnetic field strength B. The Larmor frequency is calculated according to $\omega_L = \gamma \cdot B$, wherein $\gamma$ is the gyromagnetic ratio, which is at a maximum for hydrogen nuclei. The gyromagnetic ratio indicates the proportionality factor between the angular momentum or the spin of a particle and the associated magnetic moment.

A further requirement for determining the flow of a flowing medium, in particular for the determination of the portions of individual phases of a multi-phase medium is that the individual phases of the medium are able to be excited to different nuclear magnetic resonances.

Nuclear magnetic flowmeters of the type in discussion here are used especially in the analysis of media extracted from oil sources. The medium then consists essentially of the phases crude oil, natural gas and saltwater. All phases contain hydrogen atom nuclei and thus can be excited to nuclear magnetic resonance.

The signals induced in a coil-shaped antenna after excitation by the precessing magnetic moments of the atomic nuclei are used as dependent variable for characterization of the medium. A requirement for the measurement of a multi-phase medium is, as already described above, that the individual phases of the medium are able to be excited to different nuclear magnetic resonances. The magnitude of the electric signal induced in the coil-shaped antenna by the precessing atomic nuclei of a phase of the medium depends on the number of precessing atomic nuclei per volume element in the phase, thus, i.e., dependent on the density of the phase. In a comparison of the average values of the signal amplitudes per cubic meter of gas, oil and water, it can be determined that the signal from gas can be clearly differentiated from that of oil and water. The strength of the signal can be expressed using the so-called hydrogen index HI. The hydrogen index HI describes the relative portion of hydrogen atoms of a medium in comparison to water. Thus, the hydrogen index for water is $HI_{water}=1$. For the indices of oil and gas, $HI_{oil}=0.9-1.1$ and $HI_{gas}=0-0.2$ hold true. Accordingly, the magnitude of the induced electric signals for the liquid phases is clearly greater than for the gaseous phase.

The magnitude of the electric signal induced by the precessing atomic nucleus of a phase, however, is not only dependent on the number of precessing atomic nuclei per volume element, but additionally is dependent on the exposure time of the atomic nuclei in the external magnetic field. This can be explained simply in that the magnetization has more time to build up at a longer exposure time.

The medium extracted from oil sources and flowing through the measuring tube of the flowmeter can have different flow characteristics. This means that the individual phases of the medium, as seen over the measuring tube cross-section, can be distributed differently. In particular, it is possible that the medium has a so-called stratified flow. The stratified flow is characterized in that the individual phases of the medium flow through the measuring tube in layers. The gaseous phase of the medium is located, here, in the upper part of the measuring tube, the liquid phases of the medium, i.e., the oil phase and water phase, are located in the lower part of the measuring tube. It is not uncommon that the flow velocities of the individual phases of the medium are not identical. The flow profile then has a maximum flow velocity $v_{max}$ and a minimum flow velocity $v_{min}$. Different phase velocities can lead to a so-called "phase slip", a faster-flowing phase "passing" a slower-flowing phase. This effect of "phase slip" creates a disadvantage, negatively affecting the flow measurement, as is described in the following:

As a given, there is a multi-phase medium having a gaseous phase and a liquid phase flowing through a measuring tube. The gaseous phase has the flow velocity $v_1$, the liquid phase has the flow velocity $v_2$, wherein $v_1 > v_2$. Furthermore, the measuring tube is interfused with a magnetic field over a constant section with the length L. The magnetic field has at least one component perpendicular to the direction of flow of the medium. Additionally, the medium has a stratified flow characteristic. As described above, the magnetization formed in each phase of the medium is dependent on the exposure time of the medium or the phase in the magnetic field. The gaseous phase with the flow velocity $v_1$ flowing through the section L interfused with the magnetic field remains in the magnetic field for a duration $t_1$, the liquid phase with the flow velocity $v_2$ flowing through section L interfused with the magnetic field remains in the magnetic field for a duration $t_2$. Since the flow velocity of the gaseous phase is greater than the flow velocity of the liquid phase, the exposure time of the liquid phase in the magnetic field is greater than the exposure time of the gaseous phase. This leads to a greater magnetization being able to build up in the liquid phase than in the gaseous phase. The measuring signal of the liquid phase is thus greater than that of the gaseous phase already due to the exposure time in the magnetic field.

It was already stated above that the strength of the measuring signal is dependent on the density or the hydrogen index of the respective phase. It was thus explained that the measuring signal for the gaseous phase, which has a small hydrogen index, is smaller than the measuring signal of the liquid phase, which has a higher hydrogen index, in particular a hydrogen index near 1.

The two influences mentioned above lead, overall, to the measuring signal of a bulk measurement being dominated by the slower-flowing phase, i.e., the liquid phase. The signal strength can be expressed by $$S \propto HI \left[ 1 - \exp\left( -\frac{L}{vT_1} \right) \right]$$

wherein HI is the hydrogen index, L is the length of the section interfused with the magnetic field, v is the flow velocity and $T_1$ is the spin-lattice relaxation time.

The liquid phase dominating the measuring signal makes the characterization of the gaseous phase complicated and elaborate, and in methods known from the prior art, often leads to relatively inaccurate results.

SUMMARY OF THE INVENTION

The object of the invention is, thus, to provide a method for operating a nuclear magnetic flowmeter that in particular is suitable for media exhibiting "phase slip", with which the characterization of the gaseous phase is simplified.

The object is initially and essentially achieved in that a pulse spoiling the magnetization at least in the direction of the magnetic field or a pulse sequence spoiling the magnetization in the direction of the magnetic field is emitted by the coil-shaped antenna, particularly in combination with dephasing gradients, that a waiting time $t_W$ is waited and that then a nuclear magnetic measurement is carried out in that the medium is excited with excitation pulses by the coil-shaped antenna and the measuring signals generated by the excitation in the medium are detected.

Due to the pulse spoiling the magnetization at least in the direction of the magnetic field or the pulse sequence spoiling the magnetization at least in the direction of the magnetic field, summarized together as "spoil pulse" in the following, it is achieved that the magnetization of the medium is spoiled over the area of the length of the coil-shaped antenna, thus making this part of the medium "useless" for subsequent measurement. In the waiting time $t_W$ that is waited before nuclear magnetic measurement, the medium continues to flow in the measuring tube. The path that each of the two phases, i.e., the liquid phase and the gaseous phase, covers is determined by the product of the respective flow velocity v and the waiting time $t_W$. The path that the gaseous phase thus covers is greater than the path that the liquid phase covers. This leads to the part of the medium, in which the magnetization was previously spoiled, flowing out of the area of the section of the coil-shaped antenna at different rates depending on the phase. This goes directly hand in hand with a different volume portion of "fresh" medium flowing into the area of the coil-shaped antenna for each phase. This area with "fresh" medium again has a certain magnetization in the direction of the magnetic field, which can be measured. Since the relative portion of fresh gaseous medium is greater, due to the larger flow velocity, than the relative portion of fresh liquid medium, the result is an amplification of the portion of the measuring signal generated by the gaseous medium, respectively a weakening of the portion of the measuring signal generated by the liquid medium.

BRIEF DESCRIPTION OF THE DRAWINGS

The sole FIGURE is a diagrammatic sectional view of a known type of nuclear magnetic flow meter that is suitable for use in practicing the method of the invention.

DETAILED DESCRIPTION OF THE INVENTION

FIG. 1 depicts a nuclear magnetic flowmeter 1 for determining the flow of a multi-phase medium flowing through a measuring tube 2, having a pre-magnetization unit 3 for pre-magnetization of the medium, a magnetic field generator 4 for generating magnetic field pulses that interfuse the medium and a measuring device 5 that includes at least one coil-shaped antenna 6, 7 for generating excitation pulses for exciting the medium and/or for detecting measuring signals emitted by the medium.

A particular implementation of the method according to the invention is characterized in that the pulse spoiling the magnetization is a P90 pulse, particularly followed by a dephasing gradient pulse. However, any other pulse or any other pulse sequence that can spoil the magnetization in the direction of the magnetic field is possible. Thus, the method according to the invention is not limited to the use of a P90 pulse as spoil pulse.

A further preferred implementation of the method according to the invention is characterized in that the waiting time $t_W$ is given by $$t_W \geq \frac{L_1}{v_{gas}}$$

wherein $L_1$ is the length of the coil-shaped antenna and $v_{gas}$ is the flow velocity of the gaseous phase.

As already described above, the medium continues to flow in the measuring tube after the magnetization has been spoiled in the direction of the magnetic field by the spoil pulse. The time that the gaseous phase requires for covering the entire length $L_1$ of the path containing the coil-shaped antenna results from the length $L_1$ divided by the flow velocity of the gas $v_{gas}$. If the waiting time $t_W$ has a greater value according to this, this means that the entire gas portion "exhibiting spoiled magnetization" has flowed out of the coil-shaped antenna and thus the area of the coil-shaped antenna has been completely refilled with fresh gaseous medium and emits a maximum possible nuclear magnetic measuring signal. The longer the waiting time is, the more medium of the liquid phase that leaves the coil. Accordingly, the portion of fresh liquid medium becomes greater with increasing waiting time, and thus also again provides a greater contribution to the measuring signal.

It should be taken into consideration that a longer waiting time—meaning a waiting time longer than $t_W = L_1/v_{gas}$—leads to a decrease in the effect caused by the method according to the invention, namely a decrease in the "amplification of the portion of the measuring signal generated by the gaseous medium". If more fresh liquid medium flows into the area of the coil, the contribution of the liquid medium to the measuring signal increases until, finally, the original state is reinstated, i.e., the entire coil is refilled with fresh gaseous and fresh liquid medium and the measuring signal is dominated by the liquid phase. Thus, a suitable choice for the waiting time $t_W$ is indispensable.

A particularly preferred implementation of the method according to the invention is characterized in that the waiting time $t_W$ is iteratively determined using the signal amplitude ratio $S_{gas}/S_{liquid}$ and the signal amplitude $S_{gas}$ of the gaseous phase, wherein the signal amplitude ratio and the signal amplitude of the gaseous phase are at a maximum for $t_W = L_1/v_{gas}$.

As already described above, it is absolutely of relevance to maintain a suitable value for the waiting time $t_W$ between spoiling of the magnetization in the direction of the magnetic field and beginning nuclear magnetic measurement. If it is said here to maintain a suitable value, then this means to use a value for the waiting time $t_W$, in which as much "fresh" gaseous medium as possible and as little "fresh" liquid medium as possible are found in the area of the coil-shaped antenna. An indication for this state is the value of the signal amplitude ratio $S_{gas}/S_{liquid}$ in combination with the value of the signal amplitude $S_{gas}$ of the gaseous phase. The signal amplitude of the gaseous phase has a maximum value when the gaseous portion found in the coil-shaped antenna is formed completely of "fresh" medium. This is the case for a waiting time greater or equal to $L_1/v_{gas}$. The signal amplitude of the gaseous phase has a value increasing with time for smaller waiting times. The signal amplitude ratio $S_{gas}/S_{liquid}$ has a maximum value for a waiting time $t_W = L_1/v_{gas}$, the value decreases with increasing waiting time. The point in time at which both the signal amplitude ratio and the signal amplitude of the gaseous phase are at maximum corresponds to the optimum value for the waiting time $t_W$ and is $t_W = L_1/v_{gas}$.

In an iterative method, for example, it can be assumed that the gaseous phase flows twice as fast as the liquid phase, i.e., that $v_{gas} = 2 v_{liquid} = 2 v_{bulk}$. This initially leads to a waiting time of $t_W = L_1/2v_{bulk}$. After this waiting time, a nuclear magnetic measurement can be carried out and the signal amplitudes for the fast gaseous and the slow liquid phase can be determined using this measurement data. A more exact value for the flow velocity of the gaseous phase $v_{gas}$ can be determined from the signal amplitudes of the gaseous phase determined in this manner. This can then be used to determine a "new" waiting time. Using the "new" waiting time, a next nuclear magnetic measurement can be carried out and, again, the signal amplitudes of the respective phases as well as the flow velocity of the gaseous phase can be determined more accurately using the measurement data. This iterative method is preferably used as long as a constant value results for $t_W$, which results in determining an optimum waiting time.

In turn, a preferred implementation of the method according to the invention is characterized in that the flow velocities of the individual phases are determined using the measured values obtained by the nuclear magnetic measurement.

If it is said above that the flow velocities of the individual phases, in particular the gaseous phase, are determined in an iterative method in order to define a suitable value for the waiting time $t_W$, then it should be taken into consideration that the previously determined flow velocities do not necessarily correspond to the "real" flow velocity, but rather have iteratively approached the "real" flow velocity. If it is now said that the individual phases have been determined using the measurement values, this means that the "real" flow velocities of both the gaseous phase and the liquid phase are determined, since an optimum value for the waiting time $t_W$ is used. In particular, it can be provided that the flow velocities of the individual phases are determined by suitably fitting the recorded measurement data.

A particularly preferred implementation of the method according to the invention is characterized in that the portions of the individual phases of the medium are determined using the signal amplitude ratio $S_{liquid}/S_{gas}$.

If it is presently said that the portions of the individual phases are determined, then the relative portions a of the individual phases are meant. The signal ratio is given by $$\frac{S_{liquid}}{S_{gas}} = \frac{(\alpha HI)_{liquid}}{(\alpha HI)_{gas}} \frac{\min\left(1, \frac{v_{liquid} t_W}{L_1}\right)}{\min\left(1, \frac{v_{gas} t_W}{L_1}\right)} = S_0 F(v_{liquid}, v_{gas}, t_W)$$

wherein HI is the hydrogen index of each phase, $\alpha$ is the relative portion of the respective phase in the medium, v is the flow velocity, $t_W$ is the time that is waited between the spoil pulse and the beginning of measurement, and $L_1$ is the length of the coil-shaped antenna.

The term v, $t_W/L_1$ gives the relative portion of fresh medium in the coil-shaped antenna, wherein x can represent "liquid" or "gas", i.e., thus describes the relative portion of fresh liquid medium or the relative portion of fresh gaseous medium. The term $$\min\left(1, \frac{v_x t_W}{L_1}\right)$$

means that for waiting times $t_W$ after which the entire area of the coil-shaped antenna has not yet been filled with fresh medium, the relative portion is determined using $v_x t_W/L_1$. For longer waiting times, the entire area of the coil-shaped antenna is filled with fresh medium, thus the relative portion is equal to 1.

A further, preferred implementation of the method according to the invention is characterized in that the nuclear magnetic measurement is implemented using a CPMG sequence. The method according to the invention, however, is not to be limited to a certain measuring sequence in the measuring device. Any measuring sequence applicable in the field of flow measurement is possible here.

What is claimed is:

1. Method for operating a nuclear magnetic flowmeter for determining the flow of a multi-phase medium flowing through a measuring tube, having a pre-magnetization unit for pre-magnetization of the medium, a magnetic field generator for generating a magnetic field interfusing the medium and a measuring device that includes at least one coil-shaped antenna for generating excitation signals exciting the medium and/or for detecting measuring signals emitted by the medium, comprising the steps of:

emitting a pulse spoiling the magnetization at least in the direction of the magnetic field or a pulse sequence spoiling the magnetization in the direction of the magnetic field by the coil-shaped antenna, waiting a waiting time tw, and then, carrying out a nuclear magnetic measurement by exciting the medium with excitation pulses by the coil-shaped antenna and by detecting measuring signals generated by the excitation of the medium, wherein the waiting time tw is determined in accordance with the relationship $$t_W \geq \frac{L_1}{v_{gas}}$$

wherein L1 is the length of the coil-shaped antenna and $v_{gas}$ is the flow velocity of the gaseous phase;

wherein the waiting time $t_w$ is iteratively determined using the signal amplitude and the signal amplitude $S_{gas}$ of the gaseous phase, wherein the signal amplitude ratio and the signal amplitude of the gaseous phase are at a maximum for $$t_W = \frac{L_1}{v_{gas}},$$

and wherein flow velocities of individual phases are determined using the measured values obtained by the nuclear magnetic measurements.

2. Method according to claim 1, wherein emitting the pulse spoiling the magnetization at least in the direction of the magnetic field or the pulse sequence spoiling the magnetization in the direction of the magnetic field by the coil-shaped antenna is combined with dephasing gradients.

3. Method according to claim 1, wherein the pulse spoiling the magnetization is a P90 pulse.

4. Method according to claim 3, wherein the P90 pulse is followed by a dephasing gradient pulse.

5. Method according to claim 1, wherein portions of the individual phases in the medium are determined using the signal amplitude ratio of an amplitude of a gaseous phase signal $S_{gas}$ to an amplitude of a liquid phase signal $S_{liquid}$.

6. Method according to claim 1, wherein the nuclear magnetic measurement is implemented using a CPMG sequence.

* * * * *